United States Patent
Huibers et al.

(10) Patent No.: US 6,414,111 B2
(45) Date of Patent: Jul. 2, 2002

(54) METHOD FOR SEPARATING STEROLS FROM TALL OIL

(75) Inventors: Derk T. A. Huibers, Pennington; Andrew M. Robbins, Trenton, both of NJ (US); David H. Sullivan, Morrisville, PA (US)

(73) Assignee: Arizona Chemical Company, Jacksonville, FL (US)

( * ) Notice: Subject to any disclaimer, the term of this patent is extended or adjusted under 35 U.S.C. 154(b) by 0 days.

(21) Appl. No.: 09/782,869

(22) Filed: Feb. 14, 2001

Related U.S. Application Data

(60) Division of application No. 09/618,121, filed on Jul. 17, 2000, now abandoned, which is a division of application No. 09/153,728, filed on Sep. 15, 1998, now Pat. No. 6,107,456, which is a continuation-in-part of application No. 09/143,959, filed on Aug. 31, 1998, now abandoned.

(51) Int. Cl.$^7$ .................................................. C09F 1/00
(52) U.S. Cl. ..................... 530/205; 530/207; 530/208
(58) Field of Search ............................... 530/205, 207, 530/208

(56) References Cited

U.S. PATENT DOCUMENTS

| | | |
|---|---|---|
| 2,372,446 A | 3/1945 | Osterhof et al. |
| 2,374,700 A | 5/1945 | Pollak et al. |
| 2,444,730 A | 7/1948 | Cummings et al. |
| 2,499,430 A | 3/1950 | Vogel et al. ................. 530/230 |
| 2,530,809 A | 11/1950 | Christenson et al. |
| 2,715,638 A | 8/1955 | Albrecht et al. |
| 2,716,630 A | 8/1955 | Spangenberg et al. |
| 2,724,709 A | 11/1955 | Spence |
| 2,835,682 A | 5/1958 | Steiner et al. |
| 2,886,492 A | 5/1959 | Hanson et al. |
| 3,066,160 A | 11/1962 | Hampton |
| 3,216,909 A | 11/1965 | Bress |
| 3,337,594 A | 8/1967 | Braude |
| 3,632,822 A | 1/1972 | Conroy |
| 3,644,179 A | 2/1972 | Knoer et al. |
| 3,709,793 A | 1/1973 | Bress |
| 3,879,431 A | 4/1975 | Clark et al. |
| 3,887,537 A | 6/1975 | Harada et al. |
| RE28,476 E | 7/1975 | Bress |
| 3,926,936 A | 12/1975 | Lehtinen |
| 3,965,085 A | 6/1976 | Holmborn et al. |
| 4,044,031 A | 8/1977 | Johansson et al. |
| 4,064,117 A | * 12/1977 | Leavens et al. ............. 530/208 |
| 4,076,700 A | 2/1978 | Harada et al. |
| 4,153,622 A | 5/1979 | Lamminkari et al. |
| 4,197,168 A | 4/1980 | Evans |
| 4,212,794 A | 7/1980 | Groddle et al. ............. 530/230 |
| 4,263,103 A | 4/1981 | Johnson et al. |
| 4,265,824 A | 5/1981 | Koshenniska et al. |
| 4,298,539 A | 11/1981 | Koshenniska |
| 4,337,193 A | 6/1982 | Szita |
| 4,426,322 A | 1/1984 | Stage |
| 4,483,791 A | * 11/1984 | Phillips, Jr. et al. ........ 530/208 |
| 4,495,094 A | 1/1985 | Cleary |
| 4,496,478 A | 1/1985 | Kulkarni et al. |
| 4,519,952 A | 5/1985 | Cleary et al. |
| 4,524,024 A | 6/1985 | Hughes |
| 4,536,332 A | 8/1985 | Davis et al. |
| 4,568,496 A | 2/1986 | Kulkarni et al. |
| 4,657,703 A | 4/1987 | Durkee |
| 4,657,706 A | 4/1987 | Durkee |
| 4,664,807 A | 5/1987 | Van Dam et al. |
| 4,849,122 A | 7/1989 | Barder et al. |
| 4,879,369 A | 11/1989 | Force ......................... 430/505 |
| 4,977,243 A | 12/1990 | Barder et al. ............... 530/256 |
| 5,097,012 A | 3/1992 | Thies et al. ................. 530/256 |
| 5,286,845 A | 2/1994 | Huibers et al. ............. 530/208 |

OTHER PUBLICATIONS

McSweeney, "Sulfate Navel Stores", ch. 6 in *Navel Stores: Production, Chemistry, Utilization*, (Dwayne F. Zinkel and James Russell, Eds.) Pulp Chemicals Association, New York, NY, 1989, p. 158–199.

Matyushkind et al., "Improved Beta–Sitosterol Recovery". *Brumazh. Prom.*, 5:10–12 (1967) (translation from Russian by J.L. Keaya).

Richter, "Sterols from Oleochemical Raw Materials", VCI–Symposium, Oct. 3–5, 1984, Dusseldorf, Germany (translation from German by J.J. Schmid).

* cited by examiner

Primary Examiner—Nathan M. Nutter

(57) ABSTRACT

A method is set forth for separating a sterol or sterol ester from crude tall oil comprising fractionating the crude tall oil into a residue fraction and a volatile fraction, wherein the temperature of the residue fraction does not exceed about 290° C., and wherein the residue fraction includes the sterol or sterol ester. By application of this method, which can be implemented in existing fractionating equipment or in specially designed pitch collecting apparatuses disclosed herein, the yield of sterols can exceed 50% with respect to the sterols present in crude tall oil. A method is also provided for separating unsaponifiable material from a tall oil stream comprising saponifying the stream with a mixture of sodium hydroxide and potassium hydroxide to form sodium and potassium salts of fatty acids, rosin acids, or both; evaporating the unsaponifiable material; and acidulating the unevaporated sodium and potassium salts.

6 Claims, 3 Drawing Sheets

METHOD FOR SEPARATING STEROLS FROM TALL OIL

CROSS-REFERENCE TO RELATED APPLICATION

This is a divisional of application Ser. No. 09/618,121, filed Jul. 17, 2000, and now abandoned which is a divisional of application Ser. No. 09/153,728 filed Sep. 15, 1998 and now U.S. Pat. No. 6,107,456, which is a continuation-in-part of application Ser. No. 09/143,959, filed Aug. 31, 1998, abandoned.

FIELD OF THE INVENTION

The present invention relates to the field of industrial chemical preparations and, in particular, a new method for separating sterols and sterol esters from crude tall oil.

BACKGROUND OF THE INVENTION

In the past, it has been known that crude tall oil, consisting of approximately 35–50% fatty acids, including oleic, linoleic and palmitic acids, 15–55% rosin acids, and 5–35% unsaponifiable and neutral material, could be separated into its component parts by the use of vacuum and steam assisted fractional distillation procedures based on volatility. See, for example, U.S. Pat. Nos. 2,886,492 and 3,216,909. Such fractional distillation systems commonly use a first column to separate the more volatile fatty acids and rosin acids (referred to herein as the "volatile fraction") from the less volatile materials which include many of the unsaponifiable and neutral materials such as sterols and their esters (referred to herein as the "residue fraction" or "pitch"). A second column is commonly designed to separate the more volatile fatty acids from the less volatile rosin acids. For further discussion of such fractional distillation procedures of crude tall oil, see McSweeney, "Sulfate Naval Stores," in *Naval Stores: Production. Chemistry. Utilization* (D. F. Zinkel and J. Russell, eds., Pulp Chemicals Association, New York, 1989) at pp. 160–199.

In particular, such procedures in a first cut seek to separate at least about 95% of the fatty acids and at least about 90% of the rosin acids from the remaining components of the tall oil. This separation is typically accomplished by applying sufficient heat to the crude tall oil and to the residue fraction of the aforementioned first distillation column, such as by heating the residue fraction to at least about 300° C., which causes the residue fraction to be substantially free of the more volatile components of tall oil, such as the fatty acids (less than about 5%) and the rosin acids (less than about 10%). Essentially all of the high boiling neutral components of the tall oil remain with the pitch, which includes esterified sterols. Non-esterified alcohols, however, are more likely to boil off. Additionally, non-esterified sterols are easily degraded by the high temperature. For example, more than half of the β-sitosterol found in crude tall oil is destroyed by the high temperature used to optimize for separation of the fatty and rosin acids from the other components.

There is a need for sources of sterols such as those included in tall oil. For example, β-sitosterol has been indicated as an agent that promotes the reduction of circulating cholesterol in humans, and thus is a desirable additive for foods. A method of separating sterols generally, and β-sitosterol in particular, wherein the sterols are not or substantially are not destroyed in the process, would be a useful invention in the chemical preparation industry.

SUMMARY OF THE INVENTION

In one embodiment, the invention relates to a method for separating a sterol or sterol ester from crude tall oil comprising fractionating the crude tall oil into a residue fraction and a volatile fraction, wherein the temperature of the residue fraction during the fractionation does not exceed about 290° C., and wherein the residue fraction includes the sterol or sterol ester.

A method for separating unsaponifiable material from a tall oil stream is also provided. The method comprises saponifying the stream with a mixture of sodium hydroxide and potassium hydroxide to form sodium and potassium salts of fatty acids, rosin acids, or both fatty acids and rosin acids; evaporating the unsaponifiable material; and acidulating the unevaporated sodium and potassium salts.

DETAILED DESCRIPTION OF THE INVENTION

Figure 1:
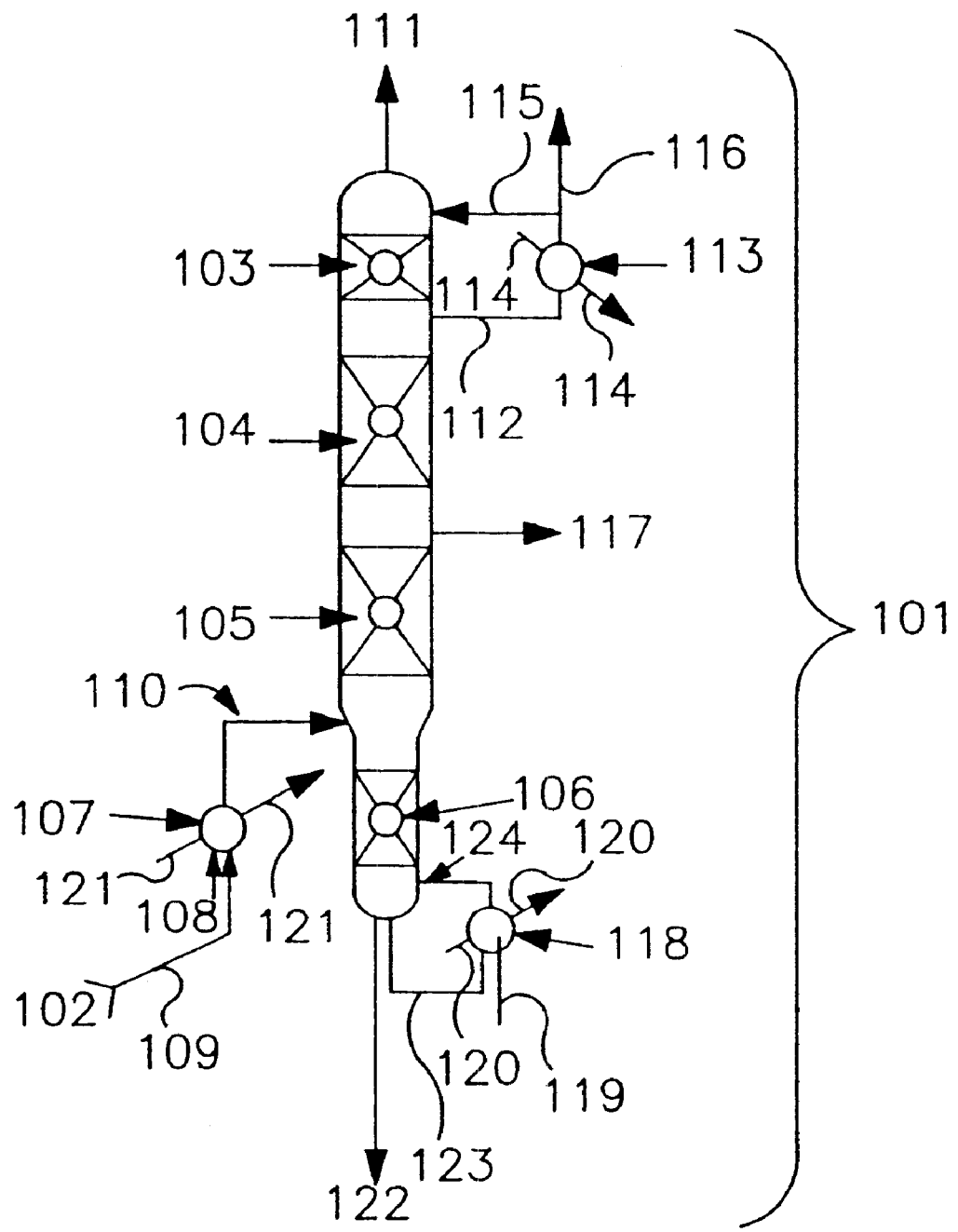
FIG. 1 is a schematic drawing of one embodiment of an apparatus for separating sterols from crude tall oil.

The present invention relates to a new method for the processing of tall oil for the purpose of separating the component sterols therefrom. In particular, tall oil is known to include a variety of free and esterified sterols, including, but not limited to, sitosterol, stigmasterol, campesterol, and saturated forms thereof such as sitostanol and campestanol. Preferably, the present invention is directed to the isolation of sitosterol; more preferably, to the isolation of β-sitosterol. Such sterols can be readily converted to a variety of related chemical species that may be useful, for example, for the purpose of conferring advantageous stability characteristics thereto during the separation process. For example, the sterols of tall oil can be converted to corresponding esters, as is known in the art. Such chemical manipulations can also present advantages for further processing of the isolated sterols for generating related chemical products therefrom. Accordingly, the present invention also relates to the preparation of such related chemical species of the sterols of tall oil. In particular, the present invention relates to a method for separating one or more of the aforementioned sterols in free or esterified form from crude tall oil comprising separating the crude tall oil into a residue or pitch fraction and a volatile fraction. As will be recognized by those skilled in the art, the residue fraction contains chemicals that substantially remain in a liquid phase upon being heated up to about 260° C. under typical commercial conditions for fractional distillation of tall oil. In addition to the sterols and their esters, these chemicals include lignin, high boiling hydrocarbons, rosin and fatty acid dimers and higher order polymers thereof, and various decomposition products of these various components. Conversely, the volatile fraction contains chemicals that substantially enter the vapor phase upon being heated to about 260° C. under typical commercial conditions for fractional distillation of tall oil. In addition to the fatty acids and rosin acids, these chemicals include a few neutral components such as decarboxylated rosin. The terms "substantially enter" and "substantially remain" indicate that at least about 75% of a chemical would be found in the indicated phase.

This process particularly relates to a first step in isolating the aforementioned sterols, that being to separate the residue fraction from the crude tall oil, which fraction includes the sterols. This first step is referred to herein as "pitch collecting" from the tall oil. It is intended that the method embodiments disclosed herein can be implemented in devices that have alternate uses, such as, for example, the evaporation of included liquids of a sample or distillation of various included components of a solution or mixture. Such devices include fractionation columns and thin film evaporators, as are known in the art.

One embodiment of the present invention includes heating of the residue fraction at least once to a suitable temperature for evolving the volatile fraction away from the residue fraction, as further set forth below. Such heating of the residue fraction can be accomplished using any suitable means for transferring heat to a liquid, such as, for example, by coursing the residue fraction through a reboiler at least once. The reboiler can be of any suitable design, such as one that includes tubing around which a heated fluid, such as hot oil, flows, through which the residue is caused to course. A similarly designed heat-transfer instrument is preferably used to heat the dehydrated unprocessed crude tall oil at the start of a pitch-collecting protocol, which instrument is herein referred to as a flash heater, in which part of the crude tall oil is preferably converted to vapor. The tubing of the flash heater or reboiler, or other such device for transferring heat to the crude tall oil or residue fraction, respectively, can receive heat via any heated fluid that is caused to course therethrough, such as, but not limited to, water, hot oil, or condensing hot oil vapor. Any oil can be used in this context of heat transfer; a preferred such oil is Dowtherm® (Dow Chemical Company, Midland, Mich.).

Heat can be transferred into and out of the apparatus in which the crude tall oil is separated into its pitch and volatile fractions in the context of the present invention in various ways. Heat preferably enters the device via heated crude tall oil, which as noted above is preferably heated in an instrument referred to as a flash heater by those skilled in the art. Additionally, heat is preferably inserted into the apparatus via additional heating of the residue fraction at least once, using the aforementioned reboiler, for example. Alternatively, or in addition, heat can be introduced into the apparatus via the release of steam heated to a suitable degree directly into the apparatus. Heat can be removed from the apparatus via radiation of heat from the apparatus itself or, more significantly, by removal therefrom of either the volatile fraction or residue fraction, in whole or in part, as needed to maintain the desired internal temperature at the point of the apparatus that includes the residue fraction.

Preferably, the heat input into the crude tall oil (CTO) at the flash heater, for example, does not exceed about 100 BTU/pound of CTO; more preferably, is between about 80 and about 100 BTU/pound of CTO; yet more preferably, is between about 80 and about 90 BTU/pound of CTO; and most preferably, is between about 85 and about 90 BTU/pound of CTO. The resultant temperature of the CTO as it exits the flash feeder, i.e., at the start of the separation process in the pitch collecting apparatus, is preferably between about 300° C. and 320° C.; and more preferably, between about 300° C. and 310° C.; and most preferably, between about 305° C. and 310° C.

Preferably, the heat input into the residue fraction at the reboiler does not exceed about 90 BTU/pound of pitch; more preferably, is between about 50 and about 90 BTU/pound of pitch; yet more preferably, is between about 70 and about 80 BTU/pound of pitch; and most preferably, is between about 75 and about 80 BTU/pound of pitch. The resultant temperature of the residue fraction as it exits the reboiler is preferably below about 290° C., more preferably between about 250° C. and about 290° C., yet more preferably between about 250° C. and 270° C., and most preferably between about 255° C. and about 265° C.

Another controllable factor that is preferably optimized for potentiating the efficiency of yield of sterols in the residue fraction is the residence time of the pitch in the pitch-collecting apparatus, i.e., the time of separating the residue fraction from the volatile fraction. Preferably, the time of separating the residue fraction from the volatile fraction does not exceed about one hour, after which the residue fraction is allowed to cool or is further subjected to processing to separate the sterols from the non-sterol components of the residue fraction, and ultimately and preferably, to separate the individual sterols into isolated or substantially isolated preparations thereof. More preferably, the time of separating the residue fraction from the volatile fraction does not exceed about 30 minutes.

It may be appreciated that there is a reciprocal relationship between temperature and residence time. For shorter residence times, higher temperatures may be permitted without sterols decomposition. For longer residence times, lower temperatures must be maintained to prevent sterols decomposition.

The residue fraction as referred to herein is preferably at least about 15% rosin acids, which is prepared in consequence of the temperature at which the residue fraction is processed, as noted above. More preferably, the residue fraction is from about 15% to about 50% rosin acids; yet more preferably, from about 25% to about 50% rosin acids; and most preferably, from about 30% to about 45% rosin acids. A factor in the temperature of the residue fraction is the proportion of rosin acids, which have a tendency to evolve away at the temperatures applied, thus effecting a cooling of the residue fraction in consequence of the heat of evaporation.

More than 50% of the sterols included in the crude tall oil that is processed in accordance with the present invention are preferably recovered. More preferably, at least about 70%; yet more preferably at least about 90%; and most preferably, at least about 95% of the sterols included in the crude tall oil are recovered. This applies in particular to the β-sitosterol. More than 50% of the β-sitosterol is preferably recovered. More preferably, at least about 70%; yet more preferably at least about 90%; and most preferably, at least about 95% of the β-sitosterol included in the crude tall oil is recovered.

As noted above, the method embodiment of the present invention is preferably implemented in the context of an apparatus designed to maintain suitable temperature of its contents, having suitable inlets and outlets for the application of external heat or coolant, introduction of crude tall oil, removal of volatile fraction or residue fraction, and reintroduction of reheated residue fraction. Preferably, such an apparatus, referred to herein as a "pitch-collecting" apparatus," includes a suitable feed flasher and reboiler, as set forth hereinabove. The pitch-collecting apparatus can have any suitable shape, including cylindrical, spherical, ellipsoidal, and the like, and can be of any suitable size, accommodating experimental testing of small samples, such as about 50 pounds per hour, or industrial processing of economically valuable quantities, such as about 50,000 pounds of crude tall oil per hour, or more.

Preferably, the pitch-collecting apparatus for collecting pitch from crude tall oil accommodates a residue fraction concentrated at the bottom and a volatile fraction concentrated at the top thereof. Such a pitch-collecting apparatus preferably comprises a distillation column suitably configured such that the partial pressure of organics at the top thereof is between about 4 and about 6 mm of mercury (Hg) and the partial pressure of organics at the bottom thereof is between about 23 and about 27 mm Hg. More preferably, the partial pressure of organics at the top thereof is between about 4 and about 5 mm Hg and the partial pressure of organics at the bottom thereof is between about 23 and about 25 mm Hg. For sterols recovery, an optimal pitch-collecting device is designed to minimize the pressure drop experienced in the column. The aforementioned pressure ranges reflect practical limitations of the described devices.

In another device for collecting pitch from crude tall oil, a thin film evaporator (discussed below), even lower temperatures and pressure can be utilized to separate the pitch under conditions that do not decompose the sterols. In this case, however, further fractionation is needed to avoid carry over of sterols with the more volatile rosin and fatty acids.

Various accessory devices used in concert with the pitch-collecting apparatus set forth herein, such as devices to store, degasify, or pump crude tall oil prior to introduction thereof into the pitch-collecting apparatus, are well known in the art, as set forth at U.S. Pat. No. 2,886,492, for example, and are not duplicated here. One embodiment of the present invention is illustrated in FIG. 1, wherein the crude tall oil (CTO) 102, after having been degassed, is pumped into the flash heater 107, where further steam 108 can be directly injected and heat can be transferred via internal heated coils symbolized by line 121, as discussed above. The CTO 102, having achieved a suitable temperature in the flash heater, is then transferred into the column 101 of the pitch-collecting apparatus via connecting tube 110. The suitably heated CTO then comes into contact with contactor regions 103, 104, 105, and 106, which allow contact points for the gas and liquid phases, thereby improving the efficiency with which the volatiles evolve up and the liquid residue fraction flows down in the apparatus. The contactor regions are preferably designed to secure as well the desired partial pressures of organics in the upper and lower regions of the apparatus. If the temperature of the column 101 is desirably reduced, vapors collecting at the top can be released via outlet 111. Condensible volatiles can be scrubbed with a circulating condensate via tube 115, which returns cooled condensed volatiles from cooler 113 that has cold water coursing therethrough via tube 114, which is fed by condensed volatiles drawn from the column 101 via tube 112. Excess condensate is discarded via tube 116. A side stream 117 can also be released, thereby removing volatiles and heat from the column 101. Further, after the residue fraction, which is in the liquid state at the bottom of the column 101, has been heated at least once to a suitable temperature, as set forth above, via the reboiler 118, which provides for heat transfer via externally-heated coils (not shown, but symbolized by line 120) through which the residue fraction courses as well as the direct injection of steam via tube 119, the residue fraction can be removed via outlet 122. The residue fraction material, as just noted, is caused to course to the reboiler 118 via tube 123 and, upon having attained a suitable temperature, the residue fraction is delivered back into the column 101 via tube 124, whereas volatile material will tend to rise through the contactor 106, etc., and the residue fraction liquid will tend to remain at the bottom, and exit out the residue fraction outlet 122. The residue fraction is then either stored, or immediately subjected to downstream processing for separating the sterols from the other residue fraction components.

Another common method for collecting pitch from crude tall oil (CTO) is to use a thin film evaporator (TFE), such as a wiped film evaporator (WFE), as are known in the art. The liquid CTO flows down the walls of the WFE, and heat is applied through the walls to evaporate the volatile fraction. The residue remains a liquid, and is collected at the bottom of the WFE. The residence time in a WFE is typically 1–2 minutes, so thermal degradation reactions are minimized.

A WFE does not have the internal contacting devices that are found in a fractionating distillation column (such as trays, or packing and distributors), so it can achieve lower pressures and temperatures. A WFE can operate at 1 mmHg, or even 0.1 mmHg; pitch collecting from CTO can be accomplished at temperatures below about 250° C.; more preferably below about 200° C.; and yet more preferably, at about 190° C. These mild conditions also make it possible to recover more of the rosin from the pitch.

Since the WFE is not a fractionating column, it is not as selective for separating the free sterols from the volatile portion of CTO. Up to 50% or more of the free sterols can be evaporated, reducing the yield of total sterols to 80% or less. This yield is enhanced by esterifying the sterols using conventional means prior to the WFE. The sterol esters are much less volatile than the free sterols, so they will not evaporate to any significant extent, even in a WFE.

The sterols will esterify with fatty acids, which have a high concentration in the CTO, but a low concentration in the pitch. About 30–60% of the sterols are esterified in the CTO, and the degree of esterification can be increased with a reactor before a WFE, i.e., by applying heat to attain a temperature of between about 250° C. to about 300° C. for about 10 to 60 minutes. The degree of sterols esterification is preferably greater than 50%. Preferably, the reactor has a residence time of about one hour, and a temperature of about 250° C. Esterification reactions are well known, and a variety of conditions can be employed, including the use of commercially available catalysts, such as di-butyl tin oxide and mineral acids.

It should be appreciated that a portion of the sterols may have already become esterified during acidulation, in an acidulation reactor where tall oil soap is converted to CTO with sulfuric acid. Sulfuric acid acts as an esterification catalyst.

Esterification can also enhance the sterols recovery in a fractionating column, because the sterol esters are more thermally stable than the free sterols. Esterification can be increased by increasing the time and temperature in the feed flasher, or in the column near the feed point. For example, the volume of the feed flasher could be doubled, or the temperature could be increased by 10–20° C., or the liquid hold-up could be increased in the liquid distributor below the feed point in the column. Esterification can also be increased by storing the CTO for days or weeks prior to processing.

According to another embodiment of the invention, unsaponifiable material is separated from a tall oil stream according to a process of saponification, evaporation and re-acidulation. A tall oil stream is subjected to saponification. By "tall oil stream" is meant a stream which is derived directly or indirectly from tall oil, and which contains saponifiable and unsaponifiable material. The saponifiable material in the tall oil stream principally comprises fatty and/or rosin acids, and esters of such acids. Examples of tall oil streams include streams of crude tall oil, distilled tall oil, tall oil pitch, and tall oil heads. Distilled tall oil is tall oil which has been subjected to initial distillation to remove tall oil pitch. Distilled tall oil is a mixture of fatty acids and rosin. Tall oil heads is a heads cut which may be taken in this first distillation column. Further fractionation of distilled tall oil in a multiple column chain typically results in four fractions: a further heads cut; a pure, distilled tall oil fatty acids cut; a mixed fraction (25–30% rosin); and tall oil rosin. Both the initial heads cut from the depitching column, and the subsequent heads cut from the fractionating columns, is referred to hereinafter collectively as "tall oil heads". Any of these fractions may comprise the tall oil stream which is treated according to the saponification method of the present invention. Preferably, the tall oil stream comprises a tall oil pitch stream.

According to the present invention, a tall oil stream (or more precisely, the rosin and fatty acids, and/or rosin or fatty acid esters contained therein) is saponified by treatment with a mixture of sodium hydroxide and potassium hydroxide. Preferably, the mixture contains sodium and potassium hydroxide in a molar ratio of about 1:1. The material which is not saponified is evaporated by, for example, using a thin film evaporator (TFE) as described below. The unevaporated portion of the tall oil stream which comprises sodium and potassium salts of the saponifiable material, is then acidulated to regenerate the rosin and fatty acids.

Figure 2:
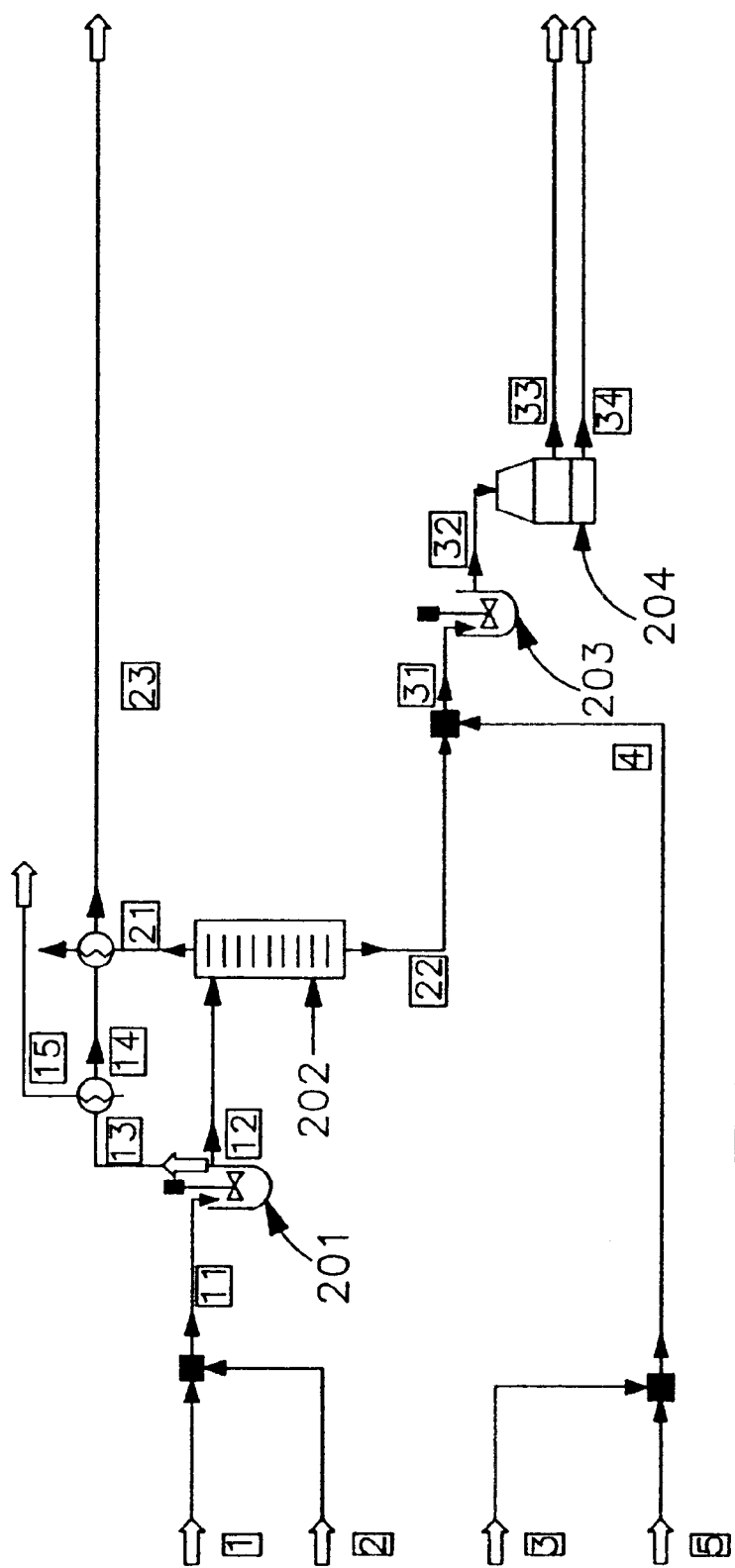
FIG. 2 is a flow sheet of the process wherein pitch produced according to the current invention is saponified, and unsaponifiables which contain β-sitosterol and other sterols are recovered by vacuum evaporation.

Accordingly, an embodiment of the present invention for sterols recovery from pitch combines a TFE with saponification of the residue fraction. Referring to FIG. 2, pitch (stream 1) which is produced according to the current invention is combined with aqueous alkali (stream 2) in a saponifier 201. The amount of alkali is preferably in an amount equal to the saponification value of the pitch or up to an excess of 20%. A preferred embodiment of the process is to use a mixture of sodium hydroxide and potassium hydroxide in order to minimize the melting point of the molten salt in the evaporator 202. The temperature in the saponifier 201 can be 60–300° C., but preferably as low as possible to prevent degradation of the β-sitosterol. The time for the reaction can be 10–60 minutes. The saponifier 201 can be operated at pressures of 30 mm Hg to 150 psig. Steam along with light unsaponifiables can be removed from the saponifier 201 through Stream 13 to produce saponified pitch (Stream 12) with preferably a maximum of 5% water content.

In accordance with this embodiment, the saponified pitch is fed to a wiped film evaporator 202. The evaporator 202 preferably operates at a pressure of 0.1 to 100 mm Hg, and a temperature of 200–300° C. Unsaponifiables are preferably evaporated from the saponified pitch and are collected and condensed (Stream 21). The steam and unsaponifiables from the saponifier 201 released via Stream 13 are preferably cooled in order to condense the unsaponifiables (Stream 14) which are separated from the steam (Stream 15), and combined with the unsaponifiables from the evaporator 202 in Stream 23. Stream 23 can be further purified by fractional crystallization to produce high-purity β-sitosterol, and other sterols.

Molten salts with 0–10% unsaponifiables remaining can exit the evaporator 202 in Stream 22. The molten salts are preferably combined with water (Stream 3) and an inorganic acid such as sulfuric acid (Stream 5) to form a Stream 31 to acidulator 203. The amount of acid will be preferably equal to the equivalent amount of alkali used in the saponification up to an excess of 10%. Where the acidulation is difficult, a thinning hydrocarbon oil can be added in an amount up to 50% of the weight of molten salts. The acidulation operates at a temperature of 90–120° C. Acidulation produces a mixture (Stream 32) which is separated in a decanter or centrifuge 204 into pitch acids (Stream 33) and spent acid (Stream 34).

Figure 3:
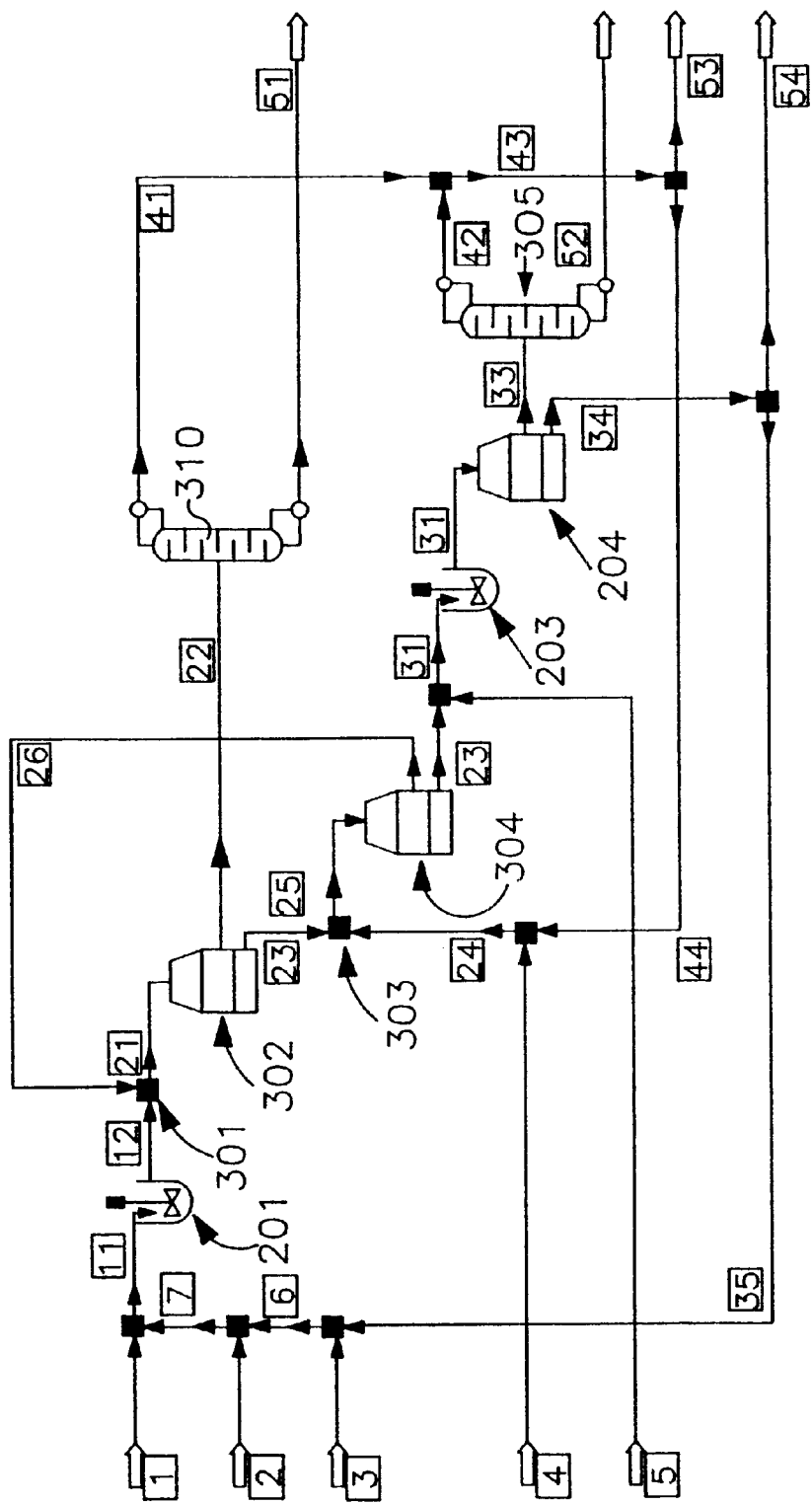
FIG. 3 is a flow sheet of the process wherein pitch produced according to the current invention is saponified, and unsaponifiables which contain β-sitosterol and other sterols are recovered by extraction with a solvent or process oil.

Yet another alternative embodiment of sterols recovery from pitch uses a two-stage extraction of saponified pitch. Referring to FIG. 3, pitch (Stream 1) which is produced according to the current invention is preferably combined with aqueous alkali (Stream 2) to form Stream 11 to a saponifier 201. Stream 3 in FIG. 3 comprises water. The amount of alkali is preferably in an amount equal to the saponification value of the pitch or up to an excess of 20%. The temperature in the saponifier 201 can be 60–300° C., but preferably is as low as possible to prevent or reduce degradation of the β-sitosterol. The time for the reaction can be 10–60 minutes. The saponifier 201 can be operated at pressures of 30 mmHg to 150 psig.

The pitch soap solution (Stream 12) from saponifier 201 is preferably extracted with a solvent or process oil in two stages. In a first stage mixer 301, the pitch soap solution is preferably contacted with the solvent extract (Stream 26) from a second stage separator 304, resulting in two phases in a first stage separator 302. The soap phase (Stream 23) from the first stage separator 302 is preferably contacted with fresh solvent (Stream 24) in a second stage mixer 303. The solvent extract phase (Stream 22) from the first stage separator 302 is preferably sent to a solvent recovery still 310 where a solvent (Stream 41) and the sterols and other unsaponifiables (Stream 51) are separated by distillation.

The soap solution phase (Stream 27) from the second stage separator is preferably acidulated in the same manner as described for FIG. 2. An inorganic acid such as sulfuric acid (Stream 5) is combined with the soap solution phase (Stream 27) to form a Stream 31 to acidulator 203. Acidulation produces a mixture (Stream 32) from which the pitch acids (Stream 33) are separated from the spent acid (Stream 34) in a decanter or centrifuge 204. Residual solvent or process oil (Stream 42) is preferably recovered from the pitch acids (Stream 52) in a vacuum distillation column 305. Some of the spent acid (Stream 35) can then be recycled to the saponifier 201 as a diluent. Stream 54 represents the remainder of the spent acids.

The recovered solvent or process oil is preferably then collected in Stream 43. Some of the residual solvent or process oil (Stream 44) is preferably combined with virgin solvent or process oil (Stream 4) to from Stream 24, which is recycled to the second stage mixer 303. Stream 53 represents the remainder of the solvent or process oil (losses).

The following examples further illustrate the present invention, but of course, should not be construed as in any way limiting its scope.

EXAMPLE 1

This example illustrates use of the pitch-collecting apparatus set forth in FIG. I to collect pitch from crude tall oil, as used in accordance with the prior art for the purpose of optimizing for yield of the volatile fraction.

The pitch-collecting apparatus was used as part of an actual operation at the Savannah Chemical Manufacturing plant of Savannah, Ga., on Jan. 22, 1996. In this run, 48,000 pounds of crude tall oil (CTO) 102 per hour were coursed through the feed flasher 107 that itself was set at 316° C. from where CTO exited at a temperature of 308° C. and entered the column 101 via tube 110. Therein, the CTO fractionated via action of the contactor regions, whereof contactor 105 had a temperature range of 282° C. to 276° C. and contactor 104 had a temperature range of 251° C. to 276° C. The residue fraction that left the column via tube 123 at 316° C. and coursed through the reboiler 118 attained a temperature of 330° C. as it exited the reboiler 118 and re-entered the column 101 via tube 124. The residue fraction was then removed from the column 101 at outlet 122, at which point the residue fraction had a temperature of 311° C.

Whereas 48,000 pounds of CTO entered the column 101 per hour, 5,225 pounds of residue fraction left the column 101 per hour, resulting in a residue yield of 10.9%. The total β-sitosterol content of the CTO feed was 2.01% (965 lbs/hr). β-Sitosterol is the principal sterol in CTO, constituting about 80% of the five sterols and stanols identified in CTO. The content of β-sitosterols in the residue fraction was 5.66% (296 lbs/hr) of which 0.48% was free and 5.18% was esterified, which was determined in accordance with the procedure of Example 3. It was also determined that the residue fraction included 3.8% stigmastadiene (196 lbs/hr), which is a dehydration product of β-sitosterol. Thus, 31% of the β-sitosterol in the CTO feed was recovered in the residue and 22% of the β-sitosterol in the CTO feed dehydrated in the residue to stigmastadiene.

EXAMPLE 2

This example illustrates use of the pitch-collecting apparatus set forth in FIG. I to collect pitch from crude tall oil, as used in accordance with the present invention for the purpose of optimizing for yield of the residue fraction, and more particularly for yield of the sterols within the residue fraction.

The pitch-collecting apparatus was used as part of an actual operation at the Savannah Chemical Manufacturing plant of Savannah, Ga., on Mar. 24, 1997. In this run, 49,021 pounds of dry crude tall oil (CTO) 102 per hour were coursed through the feed flasher 107 that itself was set at 320° C. from where CTO exited at a temperature of 302° C. and entered the column 101 via tube 110. Therein, the CTO fractionated via interaction of the contactor regions and the heated CTO, whereof contactor 104 had a temperature 20 range of 246° C. to 250° C., contactor 105 had a temperature range of 272° C. to 277° C. The residue fraction that left the column via tube 123, which had a temperature of 264° C., and coursed through the reboiler 118 attained a temperature of 276° C. as it exited and re-entered the column 101 via tube 124. The residue fraction was then removed from the column 101 at outlet 122.

Whereas 49,021 pounds of CTO entered the column 101 per hour, about 8195 pounds of residue fraction left the column 101 per hour, resulting in a residue fraction of 16.5%. Additionally, it was determined that the CTO feed contained 2.44% β-sitosterol (1196 lbs/hr) and 0.01% of stigmastadiene (5 lbs/hr). The residue fraction included 11.44% β-sitosterol (938 lbs/hr) and 0.44% stigmastadiene (38 lbs/hr), i.e., β-sitosterol was dehydrated substantially less in the lower temperature method of pitch collection of the present invention, resulting in just over 10% of degraded product (the stigmastadiene) as compared to the results and method of Example 1. The β-sitosterol in the pitch represents 78% of the β-sitosterol in the feed. The increased stigmastadiene in the pitch accounts for about 3% of the β-sitosterol in the feed. The volatile fraction (stream 117) contained 162 lbs/hr β-sitosterol and 29 lbs/hr of stigmastadiene. The β-sitosterol in the volatile fraction represented 13.5% of the total β-sitosterol in the seed. This β-sitosterol could be shifted to the residue fraction by slightly increasing the reflux ratio.

EXAMPLE 3

This example sets forth the procedures used to determine the percentage content of sterols in the CTO and in the residue fraction taken from the pitch-collecting apparatus runs discussed in Examples 1 and 2. Additionally, this example sets forth the procedures used to identify and quantify the individual sterols found in the CTO and resultant residue fractions.

The analysis is done by application of a capillary gas chromatography apparatus (GC), using standard procedures. Quantitation is done using cholesterol as an internal standard. A factor of 0.924 is used to correct the peak area for β-sitosterol relative to cholesterol. This factor results in an increased β-sitosterol content relative to the uncorrected amount. Analysis can be done of the free neutrals extracted from the native sample, or of the neutrals extracted from a saponified sample. The term "neutrals" as used herein refers to sterols and other alcohols, and polymerized and degradation products, excluding acids and salts of acids.

If total β-sitosterol (free and bound) is to be measured, the sample is saponified prior to extraction following the procedure below:

1. Weigh 0.3–0.5 g sample and 20 mg cholesterol into a flat-bottomed 125 ml boiling flask.

2. Add 50 ml of 200 proof ethanol and 6.6 g of KOH pellets, and a few glass boiling beads.

3. Attach flask to reflux condenser, turn on cooling water, and allow to reflux for 5 hours or overnight.

4. Cool saponified sample solution, and transfer to a 500 ml separatory funnel for extraction, rinsing thoroughly with water followed by ether.

The extraction procedure is as follows (however saponified samples are extracted by the procedure starting at step #4):

1. Weigh 0.5 g sample and 20 mg cholesterol into a 50 ml beaker.

2. Dissolve sample in diethyl ether.

3. Transfer to a 500 ml separatory funnel containing 250–300 ml deionized water, 5 ml 45% KOH, and 18–20 g KCl. Use diethyl ether rinse to effect a quantitative transfer of the sample.

4. Add diethyl ether to a total of approximately 100 ml and shake vigorously.

5. Allow layers to separate and drain off and discard the aqueous layer.

6. Add 50–100 ml of deionized water to the separatory funnel and shake vigorously. Drain and discard the aqueous phase. Repeat the water rinse until a check of the pH indicates a neutral or slightly acidic wash (pH 6–7).

7. Filter the diethyl ether extracts through a sintered glass (coarse fritted) funnel ⅓ filled with sodium sulfate into a 250 ml flat-bottomed boiling flask. Rinse the sodium sulfate twice with approximately 25 ml diethyl ether. Rotovap off the diethyl ether using a 65° C. water bath and no vacuum.

8. Remove ether from the rotovap reservoir and pull full vacuum on the sample flask for 5 min.

9. Dry the flask and place into a 105° C. oven for 5 min and then cool to room temperature. Dissolve the sample in 8–10 ml toluene and transfer 1–2 ml to a GC vial for analysis.

The GC analysis uses the following materials and conditions: The GC column is a DB-1, 60 m×0.25 mm, 0.25 micron film thickness. Inject 1 microliter with a 25:1 split. The carrier gas is helium, at 1 ml/min. The temperature program is as follows: initial temperature 175° C., hold for 5 min., ramp at 2° C./min to 295° C., and hold for 90 min. The injector temperature is 270° C., the detector is 300° C.

Cholesterol elutes at approximately 66.5 min, and β-sitosterol at 74.6 minutes.

EXAMPLE 4

This example illustrates a wiped film evaporator apparatus used in the context of the present invention.

This example describes the use of a wiped film evaporator (WFE), as used in accordance with the prior art, to recover the volatile fraction of crude tall oil (CTO). In this case, 50,000 pounds per hour of CTO are passed through a WFE. The CTO contains 2.44% sitosterol, of which only 40% is already esterified.

The WFE operates at 1 mm Hg, with a residue temperature of 220° C. The residue fraction leaving the bottom of the WFE is 10% of the CTO feed. The residue contains 5% rosin acids, and 17% total sitosterol. The sitosterol yield is 70%. The remaining 30% of the sitosterol is evaporated along with the volatile portion of the CTO. Thermal degradation reactions are minimal, and the pitch contains essentially no stigmastadienes.

EXAMPLE 5

This example describes the use of an esterification reactor and a wiped film evaporator (WFE), as used in accordance with the present invention, to increase the yield of sterols in the residue fraction.

In this case, 50,000 pounds/hr of CTO are passed through a 7,000 gallon reactor, (ca. 50,000 pounds hold-up), providing a residence time of approximately one hour. The reactor operates at 250° C. and ambient pressure. The CTO contains 2.44% total sitosterol. The reactor increases the extent of sterol esterification from 40% to 90%.

The reacted CTO is then fed to a WFE, operating at 1 mmHg, with a residue temperature of 220° C. The residue leaving the bottom of the WFE is about 12% of the CTO. The residue contains 5% rosin acids, and 19% total sitosterol. The sitosterol yield is 95%.

The remaining 5% of the sitosterol is evaporated along with the volatile portion of the CTO. Thermal degradation reactions are minimal, and the pitch contains essentially no stigmastadienes.

EXAMPLE 6

This example illustrates saponification of pitch and recovery of unsaponifiables with a wiped film evaporator.

4090 lb. of pitch, produced according to the current invention, were combined with 391.4 lb. of NaOH (50% aq), and 616.4 lb. KOH (45% aq) in a 750 gallon reactor. The pitch was saponified at a temperature of 185° C. and atmospheric pressure for 50 minutes. During the saponification, 561 lb. of water containing a small amount of unsaponfiables was removed from the reactor.

Analysis of the pitch before and after saponification is listed in Table A, which was accomplished using methods set forth in Example 3. Table A shows that 81% of the principal sterols were esterified.

TABLE A

Neutrals Analysis of Pitch and Saponified Pitch

|  | Pitch | | Saponified Pitch |
|---|---|---|---|
|  | Free, Wt % | Total, wt % | Total, wt % |
| Light Unsaps |  |  | 4.00 |
| Stigmastadienes | 0.62 | 0.57 | 0.90 |
| Campesterol | 0.22 | 1.09 | 0.76 |
| β-sitosterol | 2.12 | 11.16 | 7.95 |
| β-sitostanol | 0.28 | 1.48 | 1.17 |
| Total of these three sterols | 2.62 | 13.73 | 9.88 |
| Campestanol |  |  | 0.13 |
| Stigmasterol |  |  | 0.09 |
| Citrostadienol |  |  | 1.08 |
| Total GC unsaps | 8.13 | 24.51 | 17.81 |
| Heavy Neutrals |  |  | 9.99 |
| Total unsaps | 55.20 | 38.24 | 27.80 |
| Soap |  |  | 70.10 |
| Water |  |  | 2.10 |

A portion of the saponified pitch (489.27 g) was processed through a glass wiped film evaporator with a heat transfer area of 0.35 Ft$^2$ at a feed rate of approximately 4 g/min. The still was operated at 300° C. and an absolute pressure of 0.1 mm Hg. The feed temperature was 200° C. Distillate (unsaponifiables) was recovered from both an internal condenser (31.3 g) and an external condenser (102.4 g). Additional material collected in a cold trap, but the weight was not recorded. The residue (molten salts) was 337.4 g.

Neutrals analysis of the distillates and residue are shown in Table B. Of the 48.34 g of the three principal sterols contained in the saponified pitch, 7.82 g (16.2%) were recovered in the internal condensate and 35.56 g (73.6%) in the external condensate, for a total recovery of 89.8%. In the residue, 0.85 g sterols (1.8%) was detected. About 2.5% of the sterols were dehydrated to stigmastadiene.

TABLE B

Neutrals Analysis of Wiped Film Evaporator Products

|  | Residue | | Internal Condenser | | External Condenser | |
|---|---|---|---|---|---|---|
|  | gm | wt % | gm | wt % | gm | wt % |
| Light Unsaps | 0.37 | 0.11 | 3.75 | 11.99 | 24.52 | 23.93 |
| Stigmastadienes | 0.06 | 0.02 | 1.12 | 3.57 | 4.34 | 4.23 |
| Campesterol | 0.11 | 0.03 | 0.56 | 1.78 | 2.68 | 2.62 |
| β-sitosterol | 0.63 | 0.19 | 6.16 | 19.67 | 27.83 | 27.17 |
| β-sitostanol | 0.11 | 0.03 | 1.10 | 3.50 | 5.05 | 4.93 |
| Total these three sterols | 0.85 | 0.25 | 7.82 | 24.95 | 35.56 | 34.72 |
| Campestanol | 0.02 | 0.00 | 0.12 | 0.38 | 0.56 | 0.54 |
| Stigmasterol | 0.00 | 0.00 | 0.12 | 0.37 | 0.45 | 0.44 |
| Citrostadienol | 0.20 | 0.06 | 2.10 | 6.72 | 7.29 | 7.12 |
| Total GC unsaps | 1.75 | 0.52 | 16.81 | 53.70 | 79.39 | 77.50 |
| Heavy Neutrals | 9.72 | 2.88 | 11.99 | 38.30 | 22.22 | 21.69 |
| Total unsaps | 11.47 | 3.40 | 28.80 | 92.00 | 101.61 | 99.19 |
| Soap | 325.88 | 96.60 | 2.50 | 8.00 | 0.83 | 0.81 |
| Water |  |  |  |  |  |  |
| Total | 337.35 |  | 31.30 |  | 102.44 |  |
| Split | 69% |  | 6% |  | 21% |  |

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed is:

1. A method for separating unsaponifiable material from a tall oil stream comprising saponifying the stream with an aqueous mixture of sodium hydroxide and potassium hydroxide to form sodium and potassium salts of fatty acids, rosin acids, or both, evaporating the unsaponifiable material, and acidulating the unevaporated sodium and potassium salts.

2. The method of claim 1 wherein the tall oil stream is a tall oil pitch stream.

3. A method according to claim 1 wherein the molar ratio of sodium hydroxide to potassium hydroxide in said mixture of sodium hydroxide to potassium hydroxide is about 1:1.

4. A method according to claim 1 wherein the tall oil stream is saponified at a temperature of 60° C. to 300° C.

5. A method according to claim 1 wherein the tall oil stream is saponified over a reaction time of from 10 to 60 minutes, under a pressure of 30 to 150 mm Hg psig.

6. A method according to claim 1 wherein the step of evaporating the unsaponifiable material is carried out in a thin film evaporator.

* * * * *